US012744417B2

(12) United States Patent
Herrada et al.

(10) Patent No.: US 12,744,417 B2
(45) Date of Patent: Sep. 22, 2026

(54) STATOR BODY FOR AN ELECTRIC MOTOR, STATOR, ELECTRIC MOTOR, AND ASSOCIATED MANUFACTURING METHOD

(71) Applicant: VALEO SYSTÈMES D'ESSUYAGE, Le Mesnil Saint Denis (FR)

(72) Inventors: Jose Luis Herrada, Le Mesnil Saint Denis (FR); Mehdi Belhaj, Le Mesnil Saint Denis (FR)

(73) Assignee: Valeo Systemes d'Essuyage, Le Mesnil Saint Denis (FR)

( * ) Notice: Subject to any disclaimer, the term of this patent is extended or adjusted under 35 U.S.C. 154(b) by 184 days.

(21) Appl. No.: 18/696,939

(22) PCT Filed: Sep. 30, 2022

(86) PCT No.: PCT/EP2022/077407
§ 371 (c)(1),
(2) Date: Mar. 28, 2024

(87) PCT Pub. No.: WO2023/052635
PCT Pub. Date: Apr. 6, 2023

(65) Prior Publication Data

US 2025/0038590 A1 Jan. 30, 2025

(30) Foreign Application Priority Data

Sep. 30, 2021 (FR) ....................................... 2110378

(51) Int. Cl.
*H02K 1/18* (2006.01)
*H02K 1/14* (2006.01)
*H02K 15/022* (2025.01)

(52) U.S. Cl.
CPC ............ *H02K 1/185* (2013.01); *H02K 1/146* (2013.01); *H02K 15/022* (2013.01)

(58) Field of Classification Search
CPC .. H02K 1/00; H02K 1/06; H02K 1/14; H02K 1/18; H02K 1/146; H02K 1/148;
(Continued)

(56) References Cited

U.S. PATENT DOCUMENTS 4,912,353 A * 3/1990 Kondo .................. H02K 1/148
310/216.067

FOREIGN PATENT DOCUMENTS

DE 19953291 A1 * 7/2001 ............ H02K 1/148
DE 102016201967 A1 * 8/2017 ............ H02K 1/148
(Continued)

OTHER PUBLICATIONS

Machine Translation of JP 2007259562 A (Year: 2007).*
(Continued)

*Primary Examiner* — Alexander A Singh
*Assistant Examiner* — Charlie Frank Mann, Jr.
(74) *Attorney, Agent, or Firm* — Osha Bergman Watanabe & Burton LLP

(57) ABSTRACT

A stator body for an electric motor is disclosed. The stator body includes a yoke of generally cylindrical shape and including a plurality of axial notches on its inner surface, and a star including a plurality of teeth extending radially, the end of which has a shape complementary to the notches of the yoke. The star is configured to be inserted inside the yoke by axial translation. The yoke includes at least one recess formed next to at least one notch of the plurality of notches in an axial direction to allow bending of the adjacent wall of the notch during insertion of the star into the yoke. Alternately, the star includes at least one recess formed in at least one tooth of the plurality of teeth of the star in an axial direction to allow bending of the adjacent wall of the tooth.

10 Claims, 11 Drawing Sheets

(58) Field of Classification Search
CPC ............ H02K 1/185; H02K 5/00; H02K 5/02; H02K 5/021
USPC .......................................................... 310/216
See application file for complete search history.

(56) References Cited

FOREIGN PATENT DOCUMENTS

| | | | | |
|---|---|---|---|---|
| EP | 1087497 A2 * | 3/2001 | ............. H02K 1/148 |
| EP | 1322021 A1 | 6/2003 | |
| JP | 2007259562 A * | 10/2007 | |

OTHER PUBLICATIONS

Machine Translation of EP 1087497 A2 (Year: 2001).*
Machine Translation of DE 19953291 A1 (Year: 2001).*
Machine Translation of DE 102016201967 A1 (Year: 2017).*
International Search Report Issued in Corresponding PCT Application No. PCT/EP2022/077407, dated Jan. 18, 2023. (5 Pages with English Translation).
Written Opinion of International Research Authority Issued in Corresponding PCT Application No. PCT/EP2022/077407, dated Jan. 18, 2023. (6 Pages).

* cited by examiner

[Fig. 1]
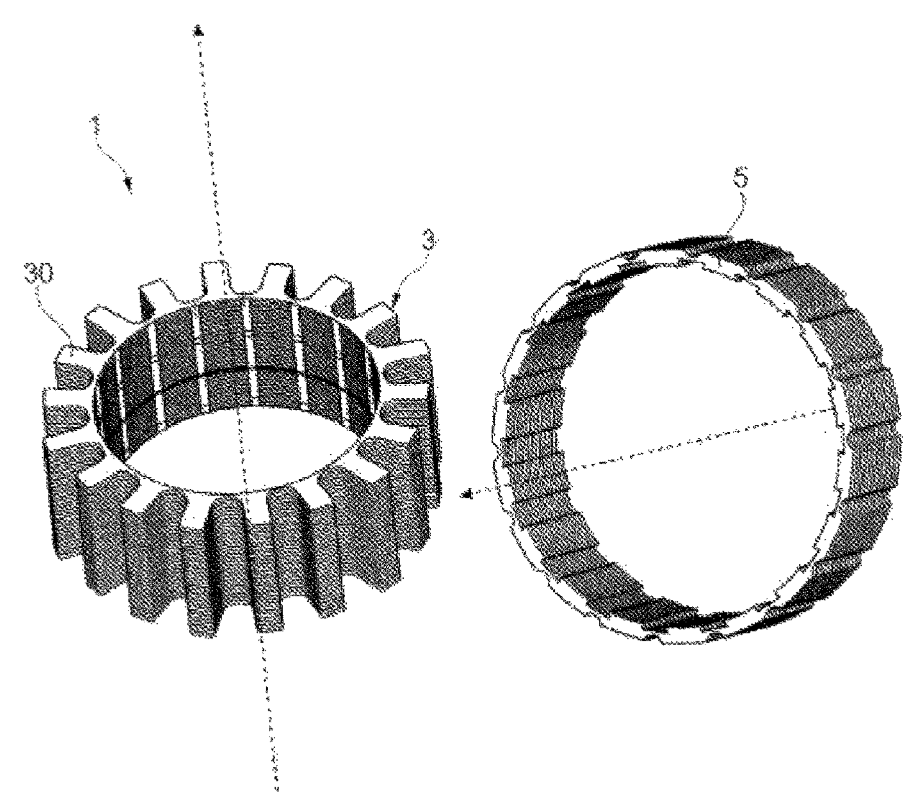
[Fig. 2]
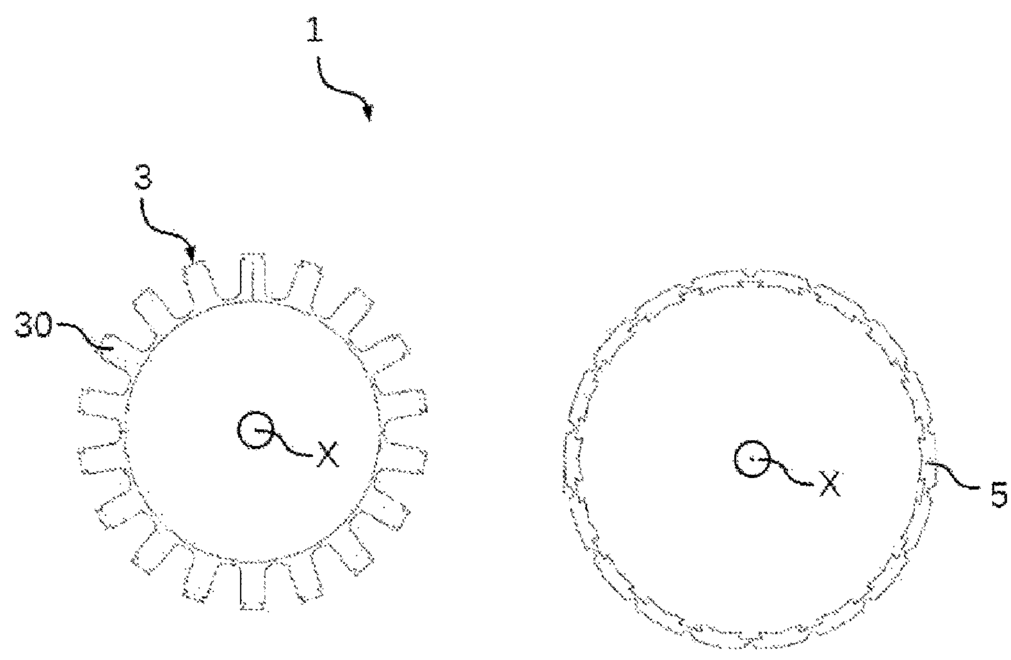

[Fig. 5]
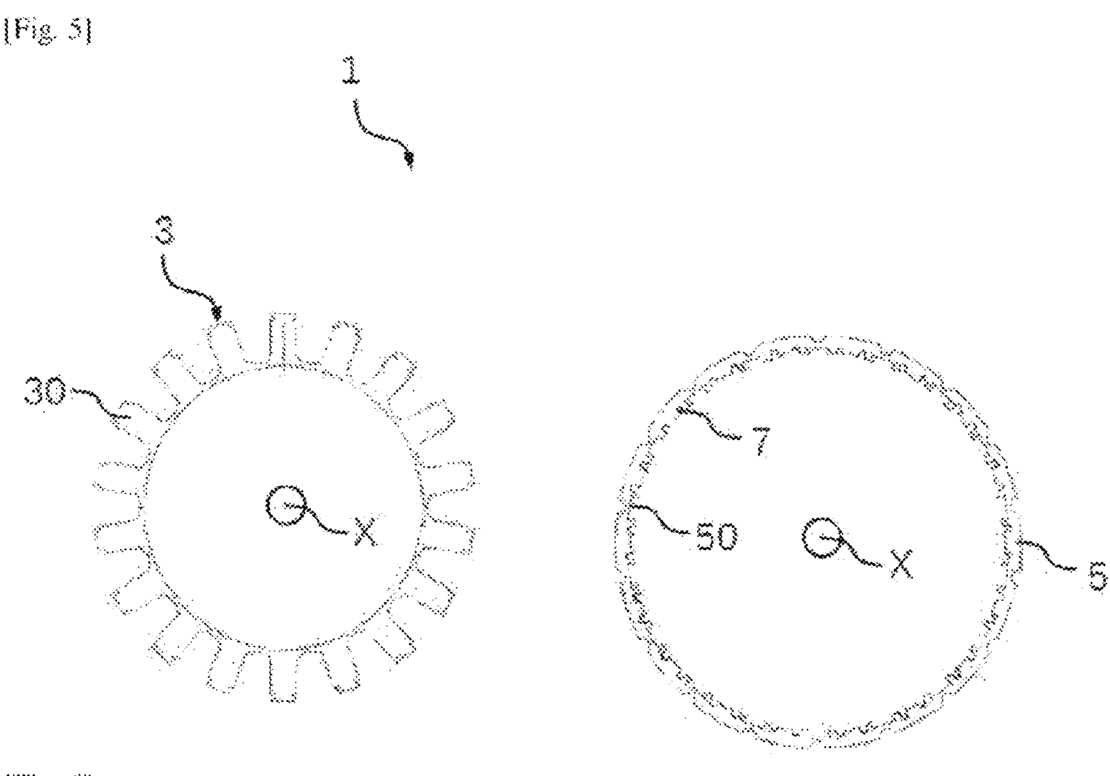
[Fig. 6]
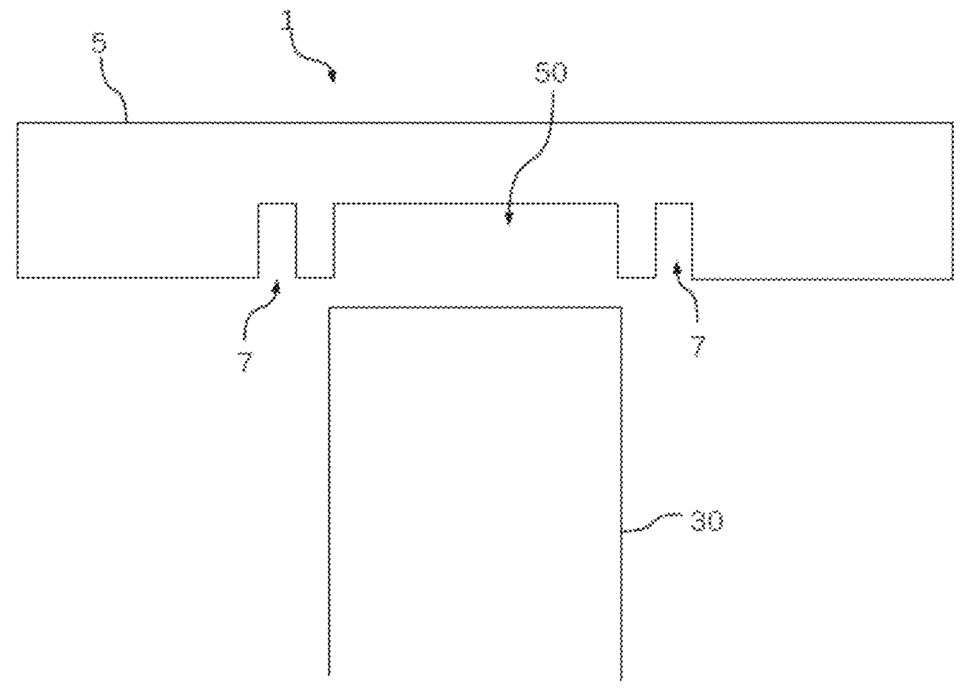

[Fig. 7]
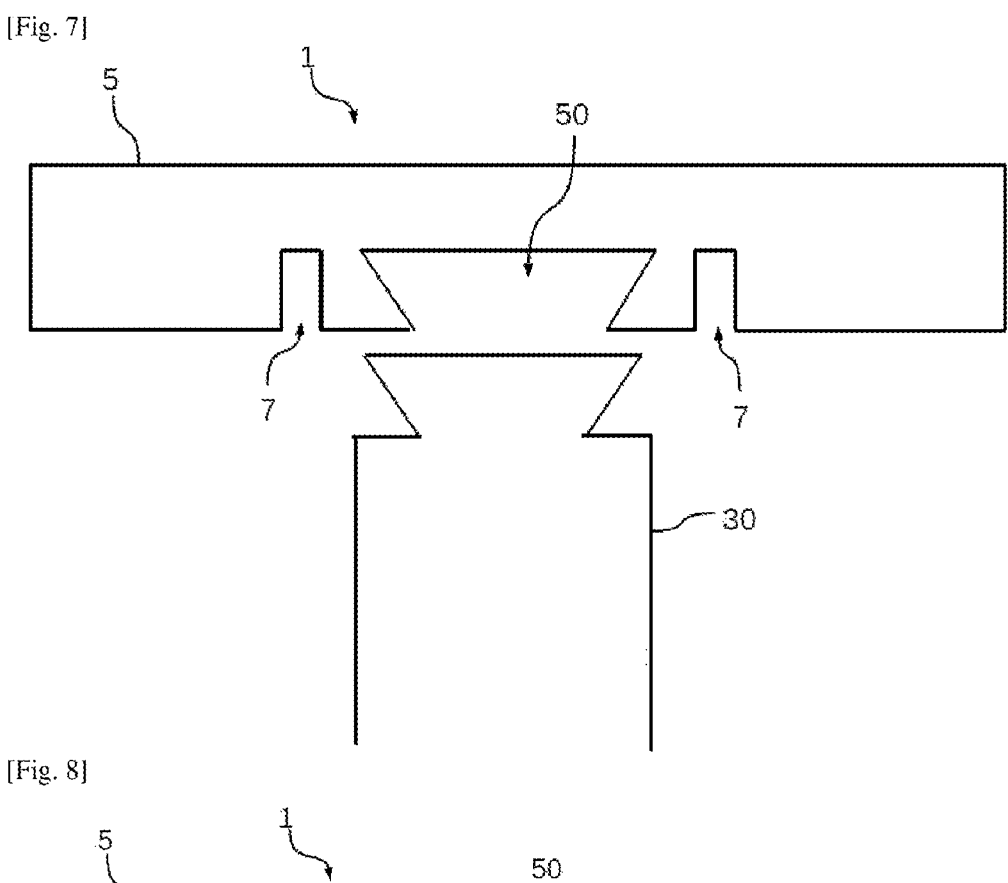
[Fig. 8]
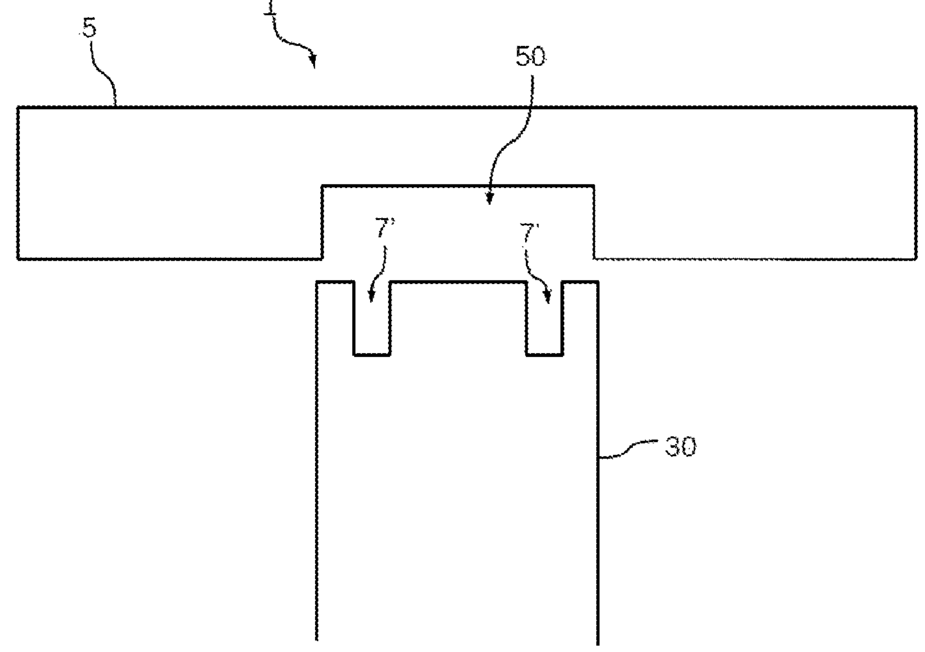

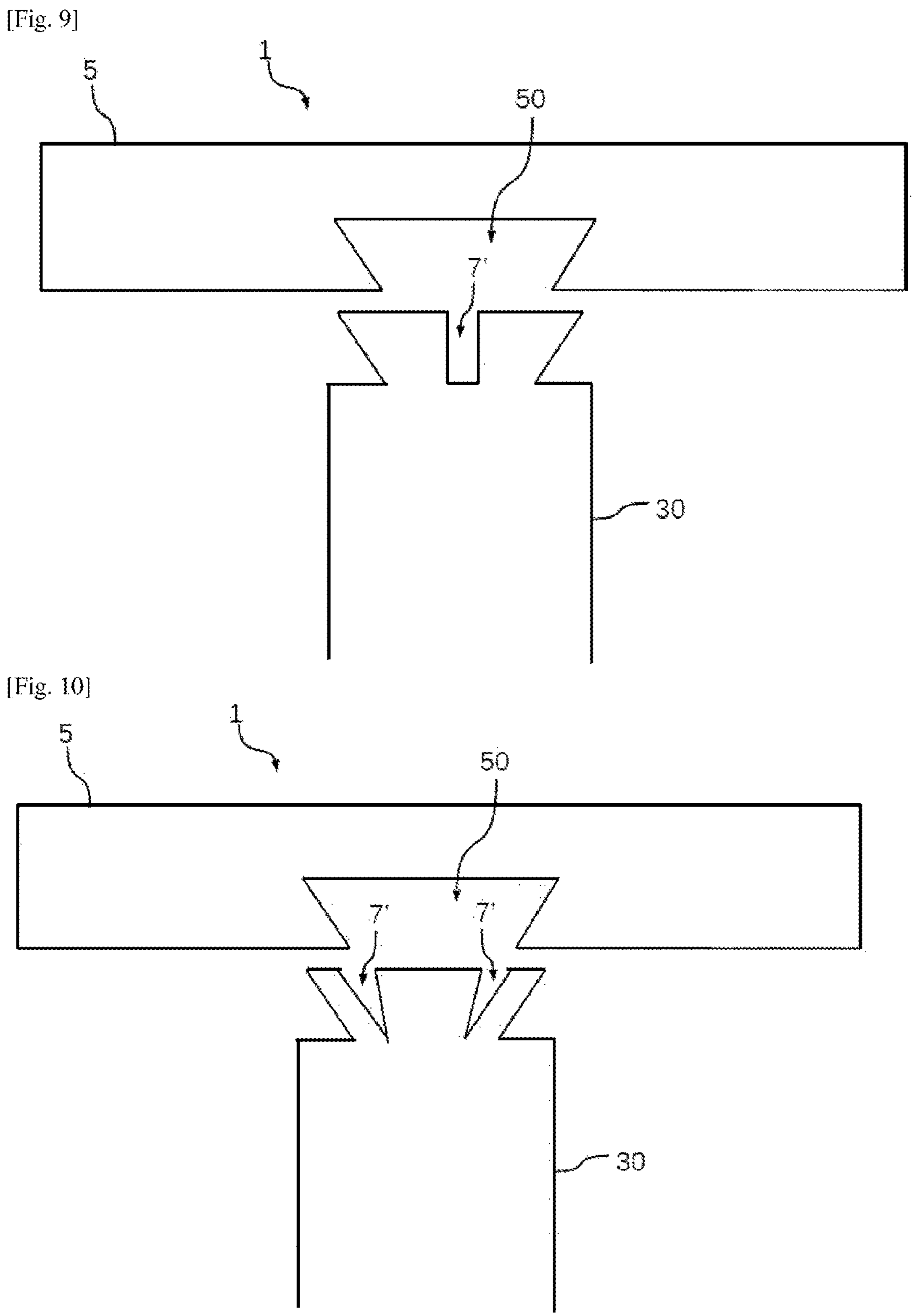
[Fig. 9]
1
5
50
7'
30
[Fig. 10]
1
5
50
7'
7'
30

[Fig. 11]
[Fig. 12]
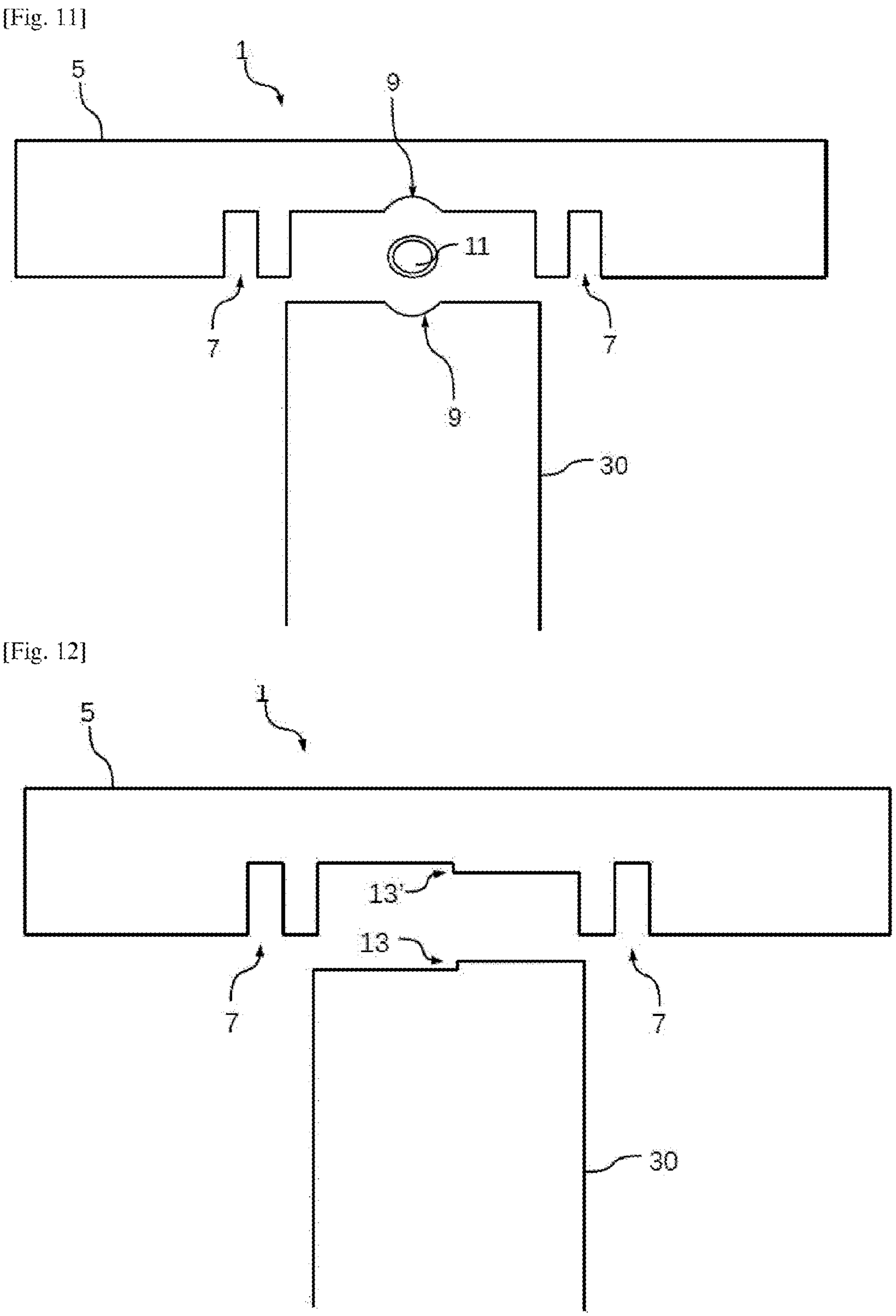

[Fig. 13]
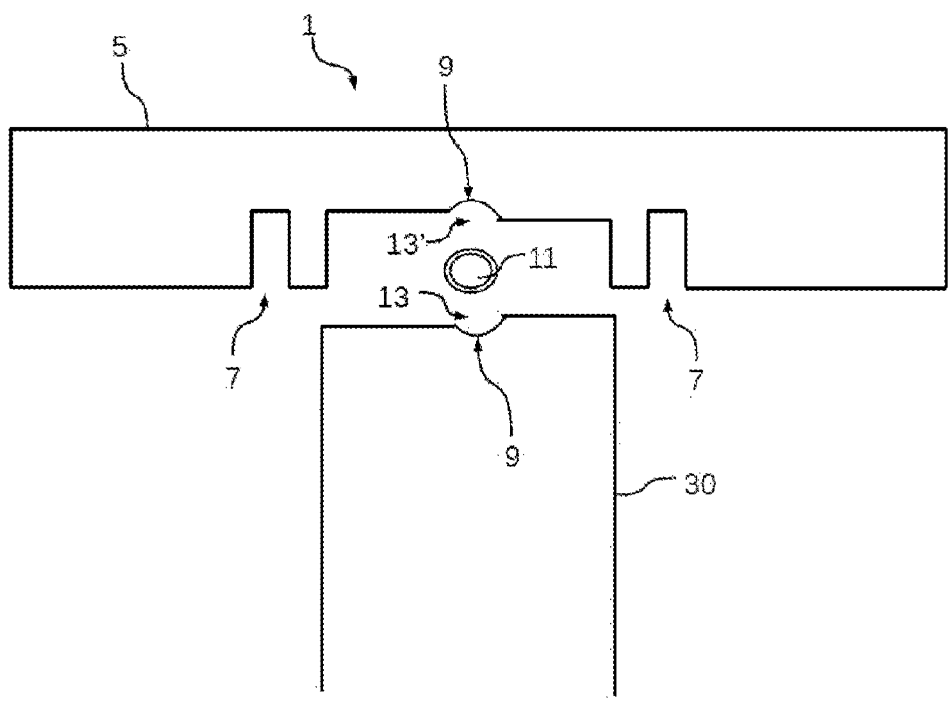
[Fig. 14]
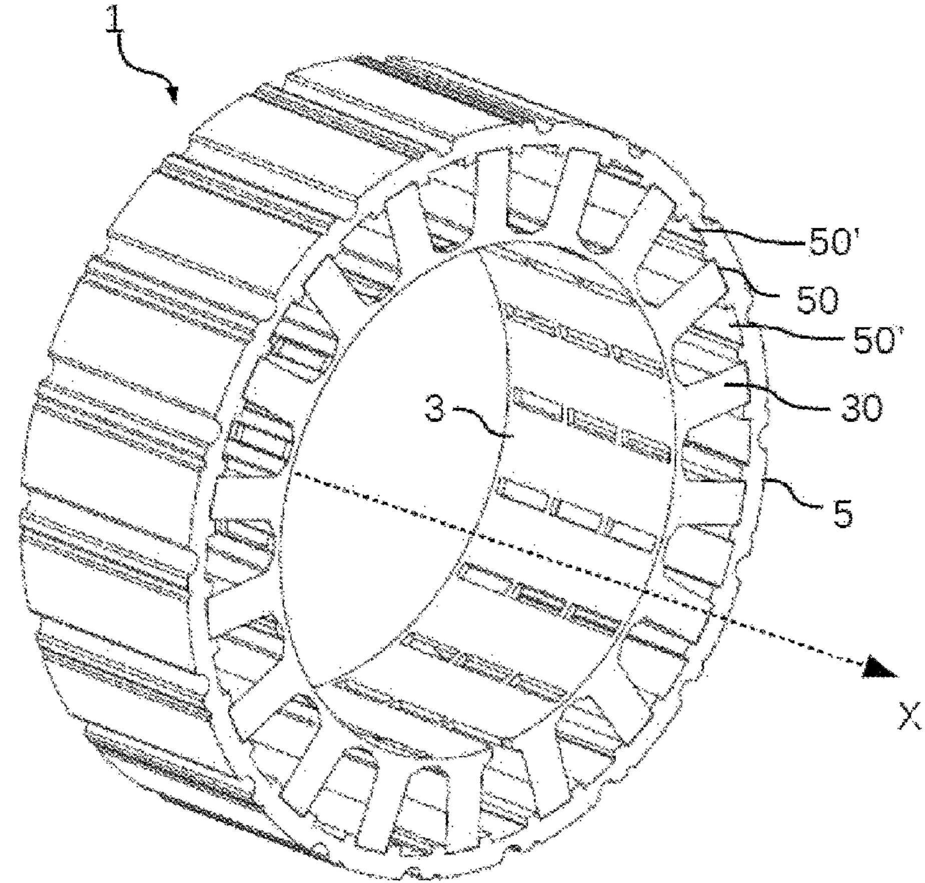

[Fig. 15]
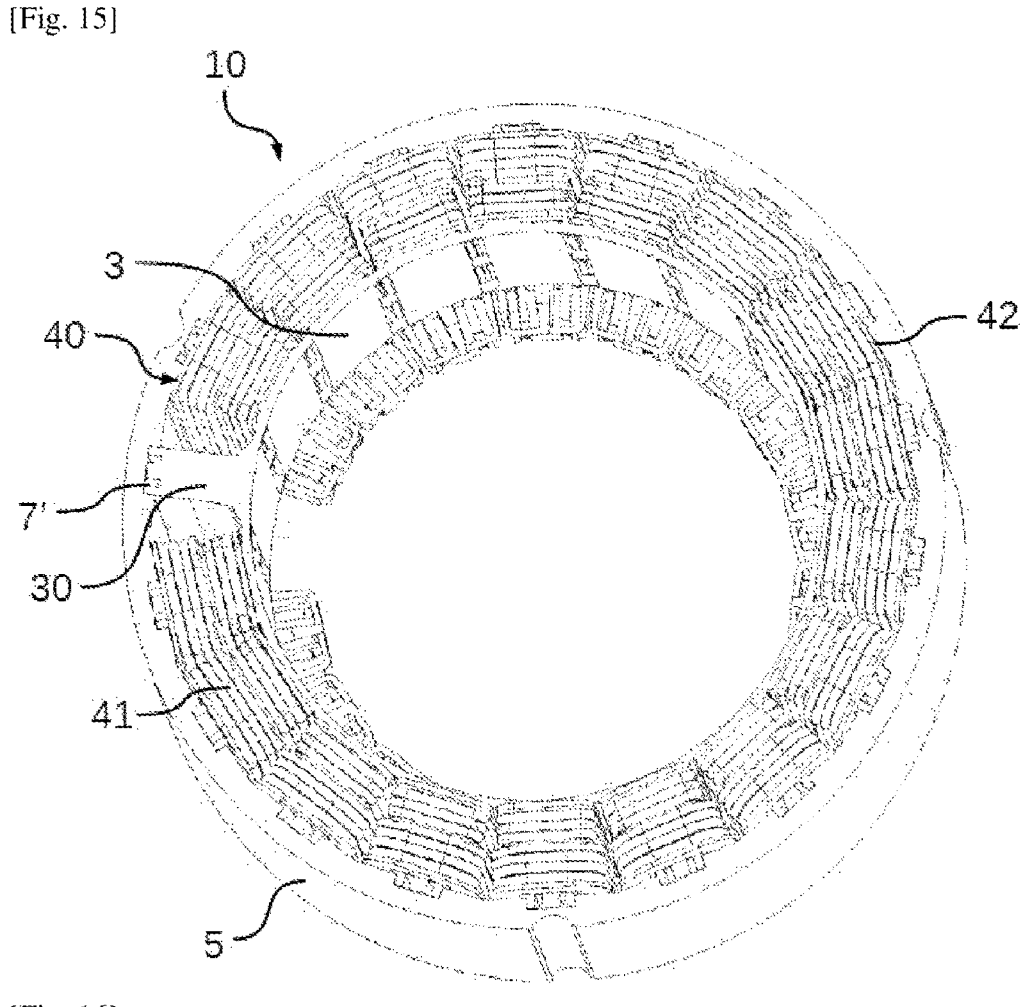
[Fig. 16]
101
102
103

[Fig. 18]
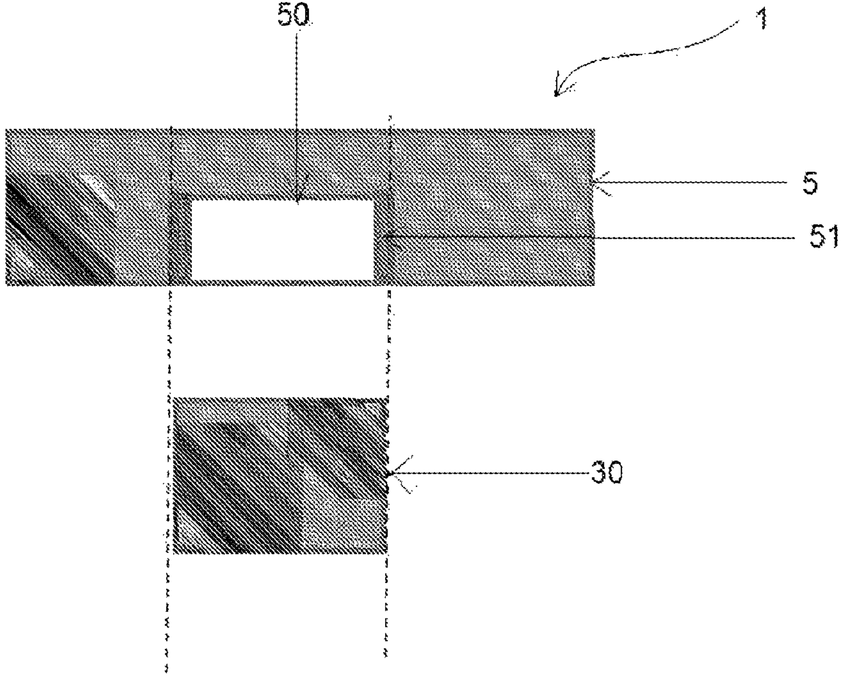
[Fig. 19]
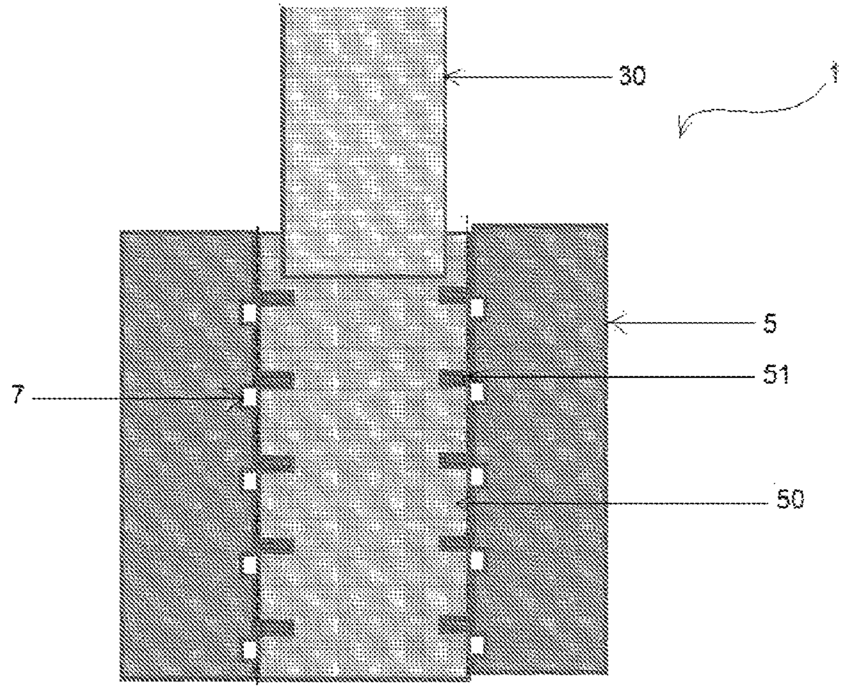

[Fig. 20]
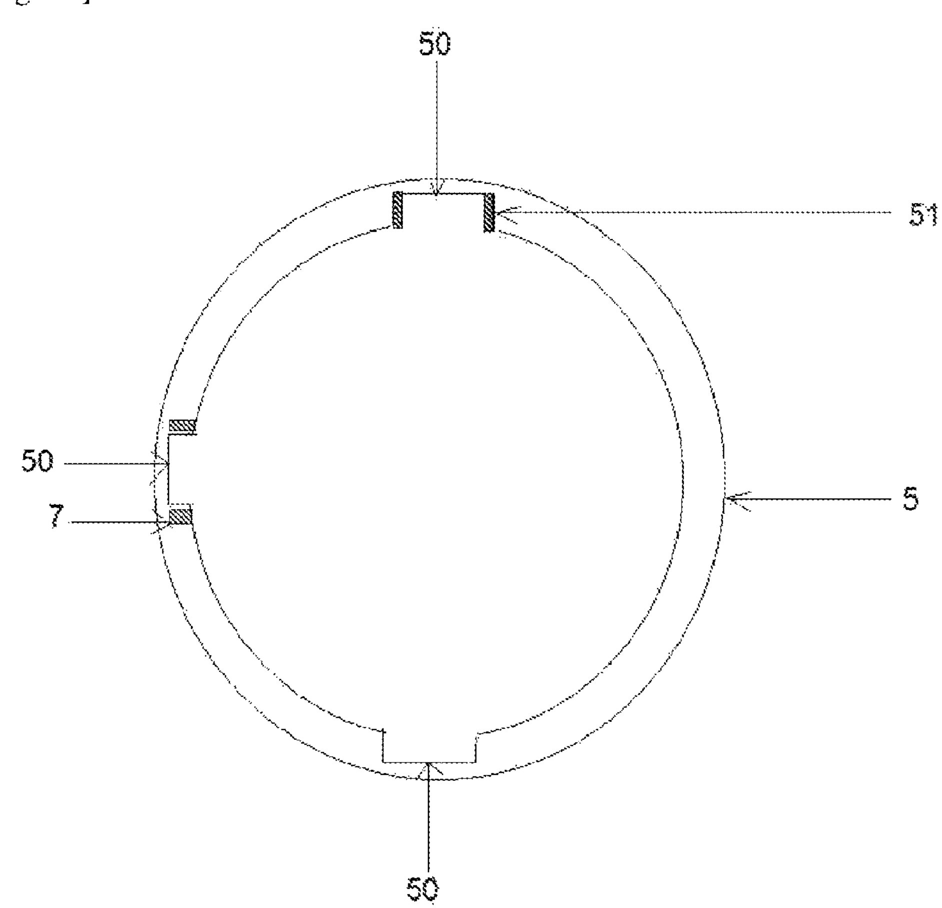

STATOR BODY FOR AN ELECTRIC MOTOR, STATOR, ELECTRIC MOTOR, AND ASSOCIATED MANUFACTURING METHOD

The present invention relates to the field of electric motors, and in particular to electric motors intended to equip electric bicycles.

Electric bicycles are becoming increasingly popular owing to the ease of travel they afford, while having low energy consumption, a low environmental impact, and a low cost price.

However, the use of an electric motor in an electric bicycle involves a number of constraints. In particular, it is necessary to provide a significant torque while limiting the weight and bulk of the electric motor as much as possible.

In order to limit the bulk, it is known practice to use stators in two parts also known as stators with separate teeth, in which the stator comprises an inner part referred to as the star comprising the teeth around which the coils are positioned, and an outer part referred to as the yoke arranged around the teeth.

The use of such a stator makes it possible to provide more space for the winding and therefore to maximize the available space and facilitate winding of the winding wire around the teeth.

However, in order to limit losses linked to the use of a two-part stator, the two parts should be mechanically secured to one another with a minimum gap between the two parts.

To this end, it is known practice to obtain the star and the yoke by cutting a common initial part. FIGS. 1 and 2 show an exemplary embodiment of a star 3 comprising a plurality of teeth 30 and a yoke 5 of a stator body 1 in two parts. FIG. 3 shows the stator body 1 in the assembled state.

However, such a manufacturing method results in low tolerances and induces interference between the parts, in particular between the end of the teeth 30 and the yoke 5 when the two parts have to be reassembled to one another after cutting, as shown in FIG. 4, owing to the deformation caused following cutting. Such interference can lead to significant deformation of the yoke 5 as a result of assembly and in particular an increase in its diameter which can then exceed the maximum tolerable dimension. This can also create spaces between the teeth 30 of the star 3 and the stator 5, liable to reduce the efficiency of the electric motor.

There is therefore a need to provide a solution making it possible to assemble the two parts of a stator 1 obtained by cutting a common initial part while limiting the deformation of the yoke 5 caused during assembly which can result in a stator 1 having dimensions that are out of tolerance.

To this end, the subject matter of the invention is therefore a stator body for an electric motor comprising:

- a yoke of generally cylindrical shape and comprising a plurality of axial notches on its inner face,
- a star comprising a plurality of teeth extending radially, the end of which has a shape complementary to the notches of the yoke, the star being configured to be inserted inside the yoke by axial translation, wherein

- the yoke comprises at least one recess formed next to at least one notch in an axial direction to allow bending of the adjacent wall of the notch during insertion of the star into the yoke, and/or
- the star comprises at least one recess formed in at least one tooth of the star in an axial direction to allow bending of the adjacent wall of the tooth.

The use of recesses made in the yoke near the notches and/or in the teeth of the star makes it possible to reduce the rigidity of the notches and/or of the teeth and thus to reduce the mechanical stress and therefore the interference that may occur between the teeth and the notches during insertion of the star into the yoke. The reduction or absence of interference makes it possible to reduce or even eliminate deformation of the yoke and to obtain a stator of compliant dimensions.

For example, the yoke comprises a plurality of recesses formed next to the notches in an axial direction to allow bending of the adjacent wall of the notch during insertion of the star into the yoke.

For example, the star comprises a plurality of recesses formed in the teeth of the star in an axial direction to allow bending of the adjacent wall of the tooth.

According to another aspect of the present invention, the yoke and the star are formed by cutting from at least one common part.

According to another aspect of the present invention, the yoke and the star are formed by cutting from a stack of a set of sheets configured to be superposed axially.

According to another aspect of the present invention, the recesses are formed only in certain sheets of the set.

According to another aspect of the present invention, the yoke comprises two axial recesses formed on either side of a notch and/or the star comprises two axial recesses formed in the teeth of the star and next to a respective edge of the tooth, for example within a range of between 0.5 and 5 mm from the edge of the tooth.

According to another aspect of the present invention, the height of the recesses is substantially equal to the height of the notches.

According to another aspect of the present invention, the width of the recesses is between 0.6 mm and 2 mm, preferably between 0.8 mm and 1 mm.

According to another aspect of the present invention, the recesses are formed in a substantially radial direction.

According to another aspect of the present invention, the notches and the end of the teeth have a rectangular or dovetail shape.

According to another aspect of the present invention, an axial through hole is formed at the interface between the end of the teeth of the star and the notches of the yoke, said hole being configured to receive a guide stud during insertion of the star into the yoke.

According to another aspect of the present invention, the notches and/or the ends of the teeth have two different heights forming a step in a tangential direction creating an area with high mechanical stress and an area with low mechanical stress between the end of the teeth and the notches during insertion of the star into the yoke.

The present invention also relates to a stator comprising a stator body as described above and a plurality of coils formed by a plurality of windings of winding wire around the teeth of the star.

The present invention also relates to an electric motor comprising a stator as described above.

The present invention also relates to a method for manufacturing a stator body as described above, said manufacturing method comprising:

- a step of cutting a stack of sheets to form, on the one hand, a star comprising a plurality of teeth and, on the other hand, a yoke comprising a plurality of notches having a shape complementary to the ends of the teeth,
- a step of forming a plurality of recesses provided in an axial direction:

in the yoke next to the notches, and/or in the teeth of the star.

According to another aspect of the present invention, the step of forming a plurality of recesses is performed only for certain sheets of the stack.

According to another aspect of the present invention, in the cutting step, the number of notches made in the yoke is double the number of teeth of the star.

According to another aspect of the present invention, at least one of the notches has a reduced width and/or height compared to the other notches.

According to another aspect of the present invention, at least one of the notches comprises at least one gripping element making it possible to hold the star and the yoke together, once the star is inserted inside the yoke.

It will be appreciated that the space available to receive the tooth is thereby reduced. More specifically, the width of the notch which is provided with at least one gripping element is reduced by the presence of these gripping elements, giving the notch a width less than the width of the tooth intended to be inserted into the notch.

For example, the at least one gripping element comprises an elastically deformable protuberance.

The protuberance may be formed in the notch.

The protuberance may be formed along the side walls of the notch. In other words, the protuberance may be formed along the walls of the notch that are adjacent to the tooth when the tooth is mounted in the notch.

In this configuration, the insertion of the tooth into the notch causes elastic deformation of the protuberances. For example, the protuberances are elastically deformable tabs.

According to one aspect of the invention, the at least one gripping element exerts sufficient pressure on the tooth of the star to allow it to be held inside the notch.

According to one aspect of the invention, the yoke may comprise:

- at least one notch comprising at least one gripping element; and/or
- at least one notch arranged next to at least one recess; and/or
- at least one notch without additional features as described above.

According to one aspect of the invention, the stator body for an electric motor may be produced according to the steps of the following method:

- stacking a set of sheets superposed in the axial direction;
- assembling the sheets to one another, for example by interlocking or grafting;
- cutting each of the sheets to obtain, on the one hand, a star slice and on the other hand, a yoke slice;
- cutting the sheets using a cutting tool to form at least one notch in the axial direction;
- inserting at least one gripping element into the at least one notch by adhesive bonding, crimping, welding, elastic interlocking, complementarity of shapes or any other means deemed appropriate by those skilled in the art;
- forming at least one recess for example by removal of material from the sheet, the at least one recess being provided next to at least one notch in the axial direction.

According to one embodiment, the sheets comprise a plurality of recesses.

Other features and advantages of the invention will become more clearly apparent on reading the following description, given by way of illustrative and nonlimiting example, and from the accompanying drawings, in which:

FIG. 1 shows a schematic perspective view of a star and a yoke of a stator body of an electric motor;

FIG. 2 shows a face-on view of the star and the yoke of FIG. 1;

Figures 3, 4:
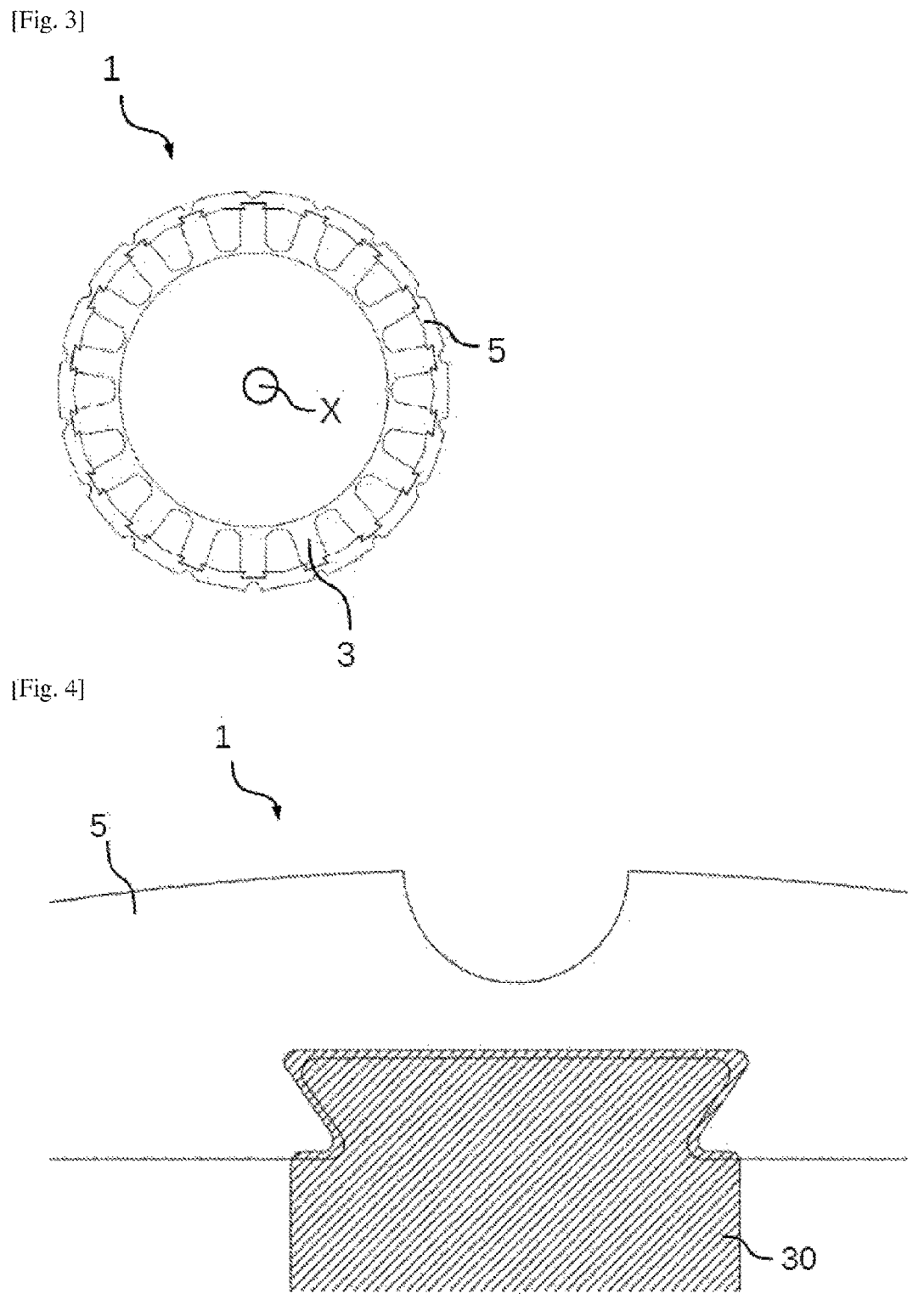

FIG. 3 shows a face-on view of the star and the yoke of FIG. 2 in the assembled state;

FIG. 4 shows an enlarged view of the interface between a star tooth and the yoke in the assembled state;

FIG. 5 shows a face-on view of the star and the yoke according to a first embodiment;

FIG. 6 schematically depicts the end of a tooth and a yoke notch according to the first embodiment of the present invention;

FIG. 7 schematically depicts the end of a tooth and a yoke notch according to a second embodiment of the present invention;

FIG. 8 schematically depicts the end of a tooth and a yoke notch according to a third embodiment of the present invention;

FIG. 9 schematically depicts the end of a tooth and a yoke notch according to a fourth embodiment of the present invention;

FIG. 10 schematically depicts the end of a tooth and a yoke notch according to a fifth embodiment of the present invention;

FIG. 11 schematically depicts the end of a tooth and a yoke notch according to a sixth embodiment of the present invention;

FIG. 12 schematically depicts the end of a tooth and a yoke notch according to a seventh embodiment of the present invention;

FIG. 13 schematically depicts the end of a tooth and a yoke notch according to an eighth embodiment of the present invention;

FIG. 14 schematically depicts a stator body according to a ninth embodiment;

FIG. 15 schematically depicts a stator comprising a stator body according to one embodiment of the present invention;

FIG. 16 shows a flowchart of the steps of a method for manufacturing a stator body according to one embodiment of the present invention;

Figure 17:
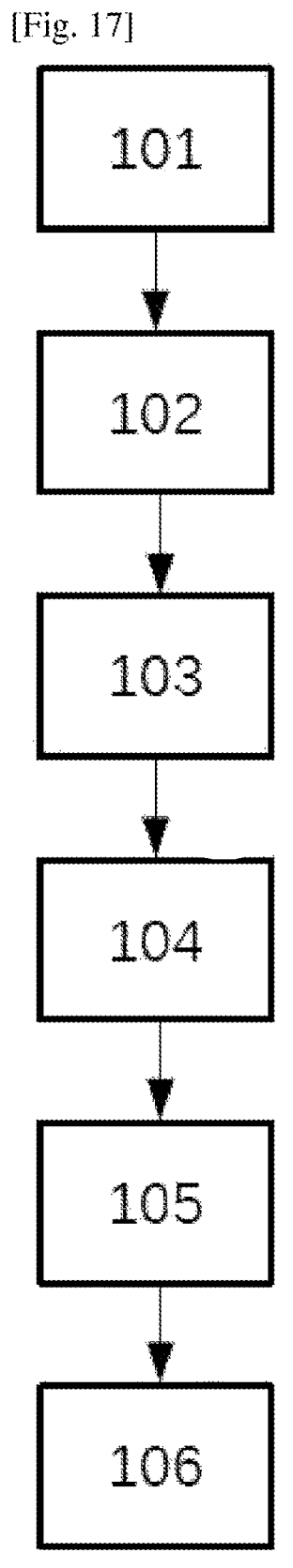

FIG. 17 shows a flowchart of the steps of a method for manufacturing a stator according to one embodiment of the present invention;

FIG. 18 schematically depicts a stator body seen from above according to a tenth embodiment of the present invention;

FIG. 19 shows a vertical section through a stator body according to the tenth embodiment;

FIG. 20 shows a top view of a yoke according to the tenth embodiment.

In these figures, identical elements have the same reference signs.

The following embodiments are examples. Although the description refers to one or more embodiments, this does not necessarily mean that each reference relates to the same embodiment, or that the features apply only to a single embodiment. Individual features of different embodiments may also be combined or interchanged to provide other embodiments.

In the present description, some elements or parameters may be given ordinal numbers such as, for example, first element or second element and first parameter and second parameter, or first criterion and second criterion, etc. In this case, the purpose of the ordinal numbering is simply to differentiate between and denote elements or parameters or criteria that are similar but not identical. This ordinal numbering does not imply any priority being given to one element, parameter or criterion over another and such designations may be interchanged easily without departing from the scope of the present description. Likewise, this ordinal numbering does not imply any chronological order, for example in evaluating any given criterion.

The present invention relates to a stator body 1 for an electric motor made in two parts, on the one hand a central star 3 and on the other hand a peripheral yoke 5 of annular shape, from at least one common initial part. In practice, the stator body 1 is generally obtained from a stack of sheets superposed in an axial direction denoted by an axis X in FIG. 5, and assembled to one another, for example by interlocking or grafting. Each sheet of the stack is thus cut to obtain, on the one hand, a star slice 3 and on the other hand, a yoke slice 5. As shown in FIG. 5, the stator body 1 comprises a star 3 comprising a plurality of teeth 30 intended to receive a plurality of respective coils, and a yoke 5 configured to be positioned around the star 3 to form the magnetic circuit. The yoke 5 has a generally cylindrical or annular shape and comprises a plurality of axial notches 50 on its inner face intended to receive the end of the teeth 30 of the star 3. The axial notches 50 may have different section shapes, for example rectangular sections as in FIG. 6 or dovetail sections as in FIG. 7. However, the invention is not limited to these shapes of notches 50. The teeth 30 of the star 3 extend radially and their end has a shape complementary to the axial notches 50 of the yoke 5. The star 3 is configured to be inserted inside the yoke 5 by axial translation along the axis X (once the coils have been positioned on the star 3). One of the axial notches 50 may have a smaller width and/or height to limit the movement of the star 3 in the yoke 5. This notch 50 is for example obtained using two cutting tools or by cutting the star 3 with an angular offset making it possible to be between two consecutive teeth 30 of the star 3 (offset of 10° for example).

The stator body 1 also comprises at least one recess, in this case a plurality of recesses 7, 7' configured to reduce interference between the star 3 and the yoke 5 during assembly. The recesses 7, 7' are for example made by removal of material, stamping or incision.

According to a first and a second embodiment shown in FIGS. 6 and 7, the recesses 7 are made in the yoke 5 and are formed next to the notches 50, for example at a distance of between 0.6 mm and 3 mm from the notches 50. The recesses 7 extend in an axial direction (along the axis X) but are not necessarily through recesses. According to one particular embodiment, the recesses 7 are formed only in certain sheets of the axial stack, for example in one sheet out of two or in two sheets out of three (this may also vary between the different areas of the yoke 5, around one notch 50 or another). The height of the recesses 7 is for example between 0.8 and 1.2 times the height of the notches 50. The width of the recesses 7 is for example between 0.6 mm and 3 mm, for example 0.8 mm. The recesses 7 are configured to allow bending of the adjacent wall of the notch 50 during insertion of the star 3 into the yoke 5 in such a way as to reduce interference which may in particular lead to an increase in the diameter of the yoke 5, without creating gaps between the teeth 30 of the star 3 and the yoke 5. In the example of FIGS. 6 and 7, recesses are provided on either side of the notch 50 but it is also possible to provide a recess 7 on only one side of a notch 50. The number of recesses 7 associated with a notch may also differ from one notch 50 to another. In the example presented in FIGS. 6 and 7, the recesses 7 have a constant width and therefore a rectangular section but other section shapes are also possible. In the example presented in FIGS. 6 and 7, the recesses 7 extend in a radial direction but other orientations are also possible, particularly in the case of notches 50 of dovetail shape.

According to a third, a fourth and a fifth embodiment shown in FIGS. 8 to 10, the recesses 7' are formed in the teeth 30 of the star 3. The various features (dimensions, shape, orientation, etc.) and variants (number, only in certain sheets, etc.) of the recesses 7' may be similar to the embodiments presented above. The recesses 7' are configured to allow bending of the adjacent wall of the tooth 30 which is intended to come into contact with a notch 50 so as to reduce interference which may in particular lead to an increase in the diameter of the yoke 5, without creating gaps between the teeth 30 of the star 3 and the yoke 5. The thickness of the wall of the tooth 30 at the recess 7' is for example between 0.6 mm and 3 mm, for example 0.8 mm.

According to another embodiment not shown, it is also possible to combine the two embodiments presented above from FIGS. 6 to 10 by providing recesses 7, 7' both in the yoke 5 and in the end of the teeth 30 of the star 3 or by providing recesses in the yoke 5 for certain tooth 30/notch 50 assemblies or certain sheets and recesses in the teeth 30 of the star 3 for other tooth 30/notch 50 assemblies or other sheets, or any possible combinations of these embodiments.

Moreover, as shown in FIG. 11, the stator body 1 may include axial through holes 9 provided at the interface between the end of the teeth 30 of the star 3 and the notches 50 of the yoke 5. The hole 9 has for example a circular section, a first half of the circle being formed in the yoke 5 and the second half of the circle being formed in the end of the tooth 30. Such holes 9 may be provided at the end of each tooth 30 of the star 3. The hole 9 is configured to receive a guide stud 11 during the insertion of the star 3 into the yoke 5 by axial translation. The guide studs 11 make it possible to orient the star 3 in the same axial direction as the yoke 5 and thus facilitate the insertion of the star 3 into the yoke 5. The guide studs 11 are for example made of steel and may include a chamfered part to facilitate their insertion into the through holes 9. The diameter of the guide studs 11 and the through holes 9 is for example between 1.5 and 2.5 mm, in particular 2 mm. Such holes 9 and guide studs 11 may be used with all of the embodiments described above.

According to one particular embodiment, two different heights may be used when forming the end of the teeth 30 of the star 3 and the notches 50 of the yoke 5, as shown in FIG. 12. These two different heights form a step at the interface between the star 3 and the yoke 5, namely a first step 13 on the tooth 30 and a second step 13' on the yoke. The difference in height (or height of the step 13, 13') is for example between 50 μm and 0.2 mm. Furthermore, during assembly, one of the parts, the star 3 or the yoke 5, is intended to be turned over such that the highest part of the tooth 30 is configured to be facing the lowest height of the notch 50, as shown in FIG. 12. Such a configuration results in high stress on part of the interface between the tooth 30 of the star 3 and the notch 50 of the yoke 5 and low stress on the other part of the tooth 30/notch 50 interface. This makes it possible to ensure contact between the star 3 and the yoke 5 in the area of high stress and thus prevent gaps between the two parts (the star 3 and the yoke 5) which could lead to losses, in particular magnetic, and therefore a reduction in the efficiency of the electric motor. Such different heights may be used with all of the embodiments described above and in particular with the holes 9 and guide studs 11, as shown in FIG. 13.

According to another embodiment shown in FIG. 14, the recesses 7 are formed by additional notches 50' made in the yoke 5 between the notches 50 intended to receive the end of the teeth 30 of the star 3. The yoke 5 comprises for example a number of notches 50, 50' equal to twice the number of teeth 30 of the star 3, the number of additional notches 50' being equal to the number of notches 50 intended to receive the end of the teeth 30 of the star 3. These additional notches 50' may be made by the same method as the notches 50 intended to receive the end of the teeth by pivoting the yoke by a predetermined angle such that the production of the additional notches 50' may be simple and quick. Like the recesses 7 in the embodiments presented in FIGS. 6 and 7, these additional notches 50' allow a slight deformation of the walls of the notches 50 without causing an increase in the diameter of the yoke 5 when the star 3 is inserted in the yoke 5.

The present invention also relates to a stator 10 comprising a stator body 1 as described above formed by a star 3 and a yoke 5. FIG. 15 shows such a stator 10. The stator 10 comprises a plurality of coils 40, eighteen coils 40 in the case of the stator 10 in FIG. 15 (one of the coils 40 is not shown in FIG. 15), configured to be positioned around the teeth 30 of the star 3. The coils 40 are for example produced by winding a winding wire 41 around a reel 42 configured to be positioned on a tooth 30 of the star 3. The star 3 is inserted into the yoke 5 when all the coils 40 are positioned on the teeth 30 of the star 3.

The present invention also relates to an electric motor comprising a stator 10 as described above. The electric motor is, for example, a three-phase motor.

The present invention also relates to a method for manufacturing a stator body 1 as described above. FIG. 16 shows a flowchart of the steps of the method for manufacturing the stator body 1.

The first step 101 concerns the stacking of sheets in an axial direction and the securing of the sheets together, for example by interlocking or grafting. The sheets are metal sheets, for example steel. The thickness of the sheets is for example 0.3 mm. The stack has a substantially cylindrical shape.

The second step 102 concerns a step of cutting the stack of sheets obtained in step 101. Cutting makes it possible to form, on the one hand, a star 3 comprising a plurality of teeth 30 and, on the other hand, a yoke 5 comprising a plurality of notches 50 having a shape complementary to the ends of the teeth 30. The end of the teeth 30 and the notches 50 may have rectangular or dovetail shapes, for example. FIG. 1 shows an example of a star 3 and a yoke 5 obtained after the cutting step 102.

The third step 103 concerns a step of forming a plurality of recesses 7 provided in the yoke 5 next to the notches 50 in an axial direction. In addition or alternatively, the step 103 may also include a step of forming a plurality of recesses 7' provided in the teeth 30 of the star 3 in an axial direction. As stated above, the number, position, shape and size of the recesses 7, 7' may be adapted according to mechanical constraints. The recesses 7, 7' may also be made only in certain sheets. The third step 103 may also include the formation of through holes 9 at the interface between the end of the teeth 30 and the yoke 5, intended to receive guide studs 11.

The recesses 7 made in the yoke 5 may also correspond to additional notches 50' (which are not intended to receive the end of a tooth 30 of the star 3).

The present invention also relates to a method for manufacturing a stator comprising the method for manufacturing the stator body 1 described above as well as additional steps described in the flowchart of FIG. 17.

The fourth step 104 concerns the winding of a plurality of turns of a winding wire 41 around a reel 42 to form a coil 40. This winding is repeated to form all of the coils 40 of the stator 10.

The fifth step 105 concerns the positioning of the coils 40 formed in step 104 on the teeth 30 of the star 3, the reels 42 being secured to the respective teeth 30 of the star 3.

As an alternative to steps 104 and 105, the winding wire 41 may be wound directly around the teeth 30 of the star 3.

The sixth step 106 concerns the positioning of the yoke 5 around the star 3 comprising the coils 40. Positioning is carried out by axial translation. Step 106 may include the prior positioning of guide studs 11 at the interface between the end of the teeth 30 and the yoke 5, if through holes 9 have been provided for this purpose in step 103. The yoke 5 is positioned around the star 3 by axial translation.

For both manufacturing methods, the order of the steps may be different from the order presented and some steps may be carried out simultaneously, for example steps 102 and 103 may be simultaneous.

FIGS. 18, 19 and 20 illustrate a tenth embodiment of the present invention described below. This embodiment differs from the above in that at least one of the notches 50 comprises at least one gripping element 51 making it possible to hold the star 3 and the yoke 5 together, once the star 3 is inserted inside the yoke 5. It will be appreciated that the space available to receive the tooth 30 is thereby reduced. More specifically, the width of the notch 50 which is provided with at least one gripping element 51 is reduced by the presence of these gripping elements 51, giving the notch 50 a width less than the width of the tooth 30 intended to be inserted into the notch 50.

In this configuration, the yoke 5 may comprise:

at least one notch 50 comprising at least one gripping element 51; and/or at least one notch 50 arranged next to at least one recess 7; and/or at least one notch 50 without additional features as described above.

This configuration is shown in FIG. 20.

In this tenth embodiment, the at least one gripping element 51 comprises an elastically deformable protuberance. The protuberance may be formed in the notch 50.

The protuberance is formed along the side walls of the notch 50. In other words, the protuberance may be formed along the walls of the notch 50 that are adjacent to the tooth 30 when the tooth 30 is mounted in the notch 50.

In this configuration, the insertion of the tooth 30 into the notch 50 causes elastic deformation of the protuberances. In this case, the protuberances are elastically deformable tabs.

For example, the at least one gripping element 51 exerts sufficient pressure on the tooth 30 of the star 3 to allow it to be held inside the notch 50.

As shown in FIG. 18, the gripping element 51 extends over the entire length of at least one side wall of the notch 50 in the radial direction, in this case both side walls of the notch 50. Those skilled in the art could also provide for the gripping element 51 to extend over part of the length of at least one side wall of the notch 50 in the radial direction, in this case both side walls.

As shown in FIG. 19, several gripping elements 51 are arranged along at least one side wall of the notch 50 in the axial direction, in this case both side walls.

In this embodiment, the stator body 1 for an electric motor is produced according to the steps of the following method:

- stacking a set of sheets superposed in the axial direction;
- assembling the sheets to one another, for example by interlocking or grafting;
- cutting each of the sheets to obtain, on the one hand, a star slice 3 and on the other hand, a yoke slice 5;
- cutting the sheets using a cutting tool to form at least one notch 50 in the axial direction;
- inserting at least one gripping element 51 into the at least one notch 50 by adhesive bonding, crimping, welding, elastic interlocking, complementarity of shapes or any other means deemed appropriate by those skilled in the art;
- forming at least one recess 7 for example by removal of material from the sheet, the at least one recess 7 being provided next to at least one notch 50 in the axial direction.

According to one embodiment, the sheets comprise a plurality of recesses 7.

The invention claimed is:

1. A stator body for an electric motor, the stator body comprising:

a yoke of generally cylindrical shape and comprising a plurality of axial notches on its inner face, and a star comprising a plurality of teeth extending radially, the end of which has a shape complementary to the notches of the yoke, wherein the yoke and the star are formed by cutting from at least one common part, such that the yoke and the star are formed by cutting from a stack of a set of sheets configured to be superposed axially, wherein the star is configured to be inserted inside the yoke by axial translation, wherein the yoke comprises at least one recess formed next to at least one notch of the plurality of notches in an axial direction to allow bending of the adjacent wall of the notch during insertion of the star into the yoke, or wherein the star comprises at least one recess formed in at least one tooth of the plurality of teeth of the star in an axial direction to allow bending of the adjacent wall of the tooth, wherein the at least one recess is formed only in certain sheets of the set.

2. The stator body as claimed in claim 1, wherein the yoke comprises two axial recesses formed on either side of the at least one notch or the star comprises two axial recesses formed in the teeth of the star and next to a respective edge of the tooth.

3. The stator body as claimed in claim 1, wherein the height of the at least one recess is substantially equal to the height of the at least one notch.

4. The stator body as claimed in claim 1, wherein the width of the at least one recess is between 0.8 mm and 1 mm.

5. The stator body as claimed in claim 1, wherein the at least one notch or the end of the at least one tooth have two different heights forming a step in a tangential direction creating an area with high mechanical stress and an area with low mechanical stress between the end of the at least one tooth and the at least one notch during insertion of the star into the yoke.

6. The stator body as claimed in claim 1, wherein the yoke comprises a plurality of recesses formed next to the notches in an axial direction to allow bending of the adjacent wall of the notch during insertion of the star into the yoke, or wherein the star comprises a plurality of recesses formed in the teeth of the star in an axial direction to allow bending of the adjacent wall of the tooth.

7. The stator body as claimed in claim 1, wherein at least one of the notches comprises at least one gripping element making it possible to hold the star and the yoke together, once the star is inserted inside the yoke.

8. A stator comprising a stator body as claimed in claim 1 and a plurality of coils formed by a plurality of windings of winding wire around the teeth of the star.

9. An electric motor comprising a stator as claimed in claim 8.

10. A method for manufacturing a stator body, the manufacturing method comprising:

cutting a stack of sheets to form, on the one hand, a star comprising a plurality of teeth and, on the other hand, a yoke comprising a plurality of notches having a shape complementary to the ends of the teeth, wherein the yoke and the star are formed by cutting from at least one common part, such that the yoke and the star are formed by cutting from a stack of a set of sheets configured to be superposed axially, forming at least one recess provided in an axial direction:

in the yoke next to at least one notch of the plurality of notches, or in at least one tooth of the plurality of teeth of the star, wherein the at least one recess is formed only in certain sheets of the set.

* * * * *